United States Patent
Newberg et al.

(10) Patent No.: US 11,921,125 B2
(45) Date of Patent: Mar. 5, 2024

(54) SLIDE INVENTORY AND REINSERTION SYSTEM

(71) Applicant: LEICA BIOSYSTEMS IMAGING, INC., Vista, CA (US)

(72) Inventors: Nicholas Newberg, San Marcos, CA (US); Prentash Djelosevic, Oceanside, CA (US); Aaron Stearrett, Port Orchard, WA (US); Peyman Najmabadi, San Diego, CA (US)

(73) Assignee: LEICA BIOSYSTEMS IMAGING, INC., Vista, CA (US)

( * ) Notice: Subject to any disclaimer, the term of this patent is extended or adjusted under 35 U.S.C. 154(b) by 132 days.

(21) Appl. No.: 17/572,595

(22) Filed: Jan. 10, 2022

(65) Prior Publication Data
US 2022/0196686 A1   Jun. 23, 2022

Related U.S. Application Data

(63) Continuation of application No. 17/079,241, filed on Oct. 23, 2020, now Pat. No. 11,221,343, which is a continuation of application No. 16/152,203, filed on Oct. 4, 2018, now Pat. No. 10,816,562.

(60) Provisional application No. 62/568,195, filed on Oct. 4, 2017.

(51) Int. Cl.
| | |
|---|---|
| *G01N 35/00* | (2006.01) |
| *G01N 21/84* | (2006.01) |
| *G01V 8/12* | (2006.01) |

(52) U.S. Cl.
CPC ....... *G01N 35/00029* (2013.01); *G01N 21/84* (2013.01); *G01V 8/12* (2013.01); *G01N 2035/00039* (2013.01); *G01N 2035/00138* (2013.01)

(58) Field of Classification Search
CPC . G01N 35/00029; G01N 2035/000138; G01N 2035/00039; G01V 8/12
See application file for complete search history.

(56) References Cited

U.S. PATENT DOCUMENTS

| | | | |
|---|---|---|---|
| 6,592,324 B2 | 7/2003 | Downs et al. | |
| 6,932,557 B2 | 8/2005 | Downs et al. | |
| 7,140,738 B2 | 11/2006 | Guiney et al. | |
| 7,300,163 B2 | 11/2007 | Scampini | |

(Continued)

FOREIGN PATENT DOCUMENTS

| | | |
|---|---|---|
| CN | 102122066 A | 7/2011 |
| CN | 204790089 U | 11/2015 |

(Continued)

OTHER PUBLICATIONS

Extended European Search Report for EP 18864162.5 dated Jan. 26, 2021 in 9 pages.

(Continued)

*Primary Examiner* — Kevin K Pyo
(74) *Attorney, Agent, or Firm* — Frost Brown Todd LLP

(57) ABSTRACT

A slide rack inventory and reinsertion system for use with a digital slide scanning apparatus is provided that determines, prior to scanning of glass slides in a slide rack, a status of each slot in the slide rack as properly occupied, improperly occupied, or empty. The system also determines whether a slide that has been removed from the slide rack for processing has been properly reinserted into the slide rack.

17 Claims, 5 Drawing Sheets

(56) References Cited

U.S. PATENT DOCUMENTS

| | | |
|---|---|---|
| 7,422,411 B2 | 9/2008 | Downs et al. |
| 7,859,667 B2 | 12/2010 | Scampini |
| 7,952,798 B2 | 5/2011 | Ljungmann et al. |
| 8,149,505 B2 | 4/2012 | Fischer et al. |
| 8,257,968 B2 | 9/2012 | Sweet et al. |
| 8,498,049 B2 | 7/2013 | Ljungmann et al. |
| 8,622,681 B2 | 1/2014 | Rippl et al. |
| 8,663,978 B2 | 3/2014 | Sweet et al. |
| 8,722,412 B2 | 5/2014 | Egle et al. |
| 8,752,783 B2 | 6/2014 | Lin et al. |
| 8,796,186 B2 | 8/2014 | Shirazi |
| 8,797,396 B2 | 8/2014 | Dietz et al. |
| 9,201,234 B2 | 12/2015 | Gelbart |
| 9,267,785 B2 | 2/2016 | Huang et al. |
| 9,362,152 B2 | 6/2016 | Wada et al. |
| 10,654,655 B2 * | 5/2020 | Newberg ............ G02B 21/26 |
| 10,816,562 B2 | 10/2020 | Newberg et al. |
| 11,221,343 B2 | 1/2022 | Newberg et al. |
| 2004/0086368 A1 | 5/2004 | Downs et al. |
| 2004/0251796 A1 | 12/2004 | Wood |
| 2005/0186114 A1 | 8/2005 | Reinhardt et al. |
| 2006/0109432 A1 | 5/2006 | Guiney et al. |
| 2008/0014119 A1 | 1/2008 | Metzner |
| 2008/0055572 A1 | 3/2008 | Scampini |
| 2008/0240613 A1 | 10/2008 | Dietz et al. |
| 2010/0040439 A1 | 2/2010 | Temple et al. |
| 2012/0092481 A1 | 4/2012 | Dietz et al. |
| 2012/0148380 A1 | 6/2012 | Wilke |
| 2012/0171003 A1 | 7/2012 | Egle et al. |
| 2012/0286531 A1 | 11/2012 | Hajrovic |
| 2012/0290127 A1 | 11/2012 | Neef et al. |
| 2014/0178169 A1 | 6/2014 | Hebert et al. |
| 2014/0266620 A1 | 9/2014 | Iqbal et al. |

FOREIGN PATENT DOCUMENTS

| | | |
|---|---|---|
| CN | 105372439 A | 3/2016 |
| CN | 111149001 A | 5/2020 |
| JP | 2008-139117 A | 6/2008 |
| JP | 2020-536279 A | 12/2020 |
| WO | WO 2019/071049 A1 | 4/2019 |

OTHER PUBLICATIONS

Notice of Reasonsfor Refusal in Japanese Application No. 2020-518713 dated Mar. 22, 2021, in 10 pages.
Notice of Reasonsfor Refusal in Japanese Application No. 2020-518713 dated Nov. 29, 2021, in 11 pages.
International Search Report and Written Opinion date Jan. 8, 2019 for related Application No. PCT/US2018/054470, in 13 pages.
International Search Report and Written Opinion dated Feb. 8, 2019 for App No. PCT/US2018/063461, in 8 pages.
Aperio GT 450, screenshot of Google image search results, accessed on Jan. 17, 2019.
Leica Biosystems: "Leica Aperio GT 450 RUO", uploaded Jul. 30, 2019, retrieved from the internet <https://vimeo.com/350887835>, accessed Sep. 8, 2022.
Chinese Office Action and Search Report dated Feb. 27, 2023, for Application No. 201880062682.5, 16 pages.
European Communication dated Jan. 27, 2023, for Application No. 18864162.5, 8 pages.
Japanese Notification of Reasons for Refusal dated Mar. 14, 2023, for Application No. 2022-053695, 3 pages.

* cited by examiner (TOP VIEW)

(TOP VIEW)

SLIDE INVENTORY AND REINSERTION SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. The present application is a continuation of U.S. patent application Ser. No. 17/079,241, issuing as U.S. Pat. No. 11,221,343; that application was a continuation of U.S. patent application Ser. No. 16/152,203, filed Oct. 4, 2018 and issued Oct. 27, 2022 as U.S. Pat. No. 10,816,562; that application claimed priority to U.S. Provisional Patent App. No. 62/568,195, filed on Oct. 4, 2017. The entire contents of each of the above-referenced documents is hereby incorporated herein by reference as if set forth in full, for all purposes.

BACKGROUND OF THE INVENTION

Field of the Invention

The present invention generally relates to a digital slide scanning apparatus and more particularly relates to processing of individual slides (e.g., glass slides) housed in slide racks by a digital slide scanning apparatus (e.g., for digital pathology).

Description of the Related Art

Digital pathology is an image-based information environment which is enabled by computer technology that allows for the management of information generated from a physical slide. Digital pathology is enabled in part by virtual microscopy, which is the practice of scanning a specimen on a physical glass slide and creating a digital slide image that can be stored, viewed, managed, and analyzed on a computer monitor. With the capability of imaging an entire glass slide, the field of digital pathology has exploded and is currently regarded as one of the most promising avenues of diagnostic medicine in order to achieve even better, faster, and cheaper diagnosis, prognosis, and prediction of important diseases, such as cancer.

Glass slides that are processed by a digital slide scanning apparatus are very fragile and highly valuable. In some instances, slides in a slide rack may be improperly positioned. This can cause conventional digital slide scanners to damage the glass slides when the glass slides are processed, for example by attempting to retrieve an improperly positioned glass slide from a slide rack and load the glass slide onto the scanning stage. Therefore, what is needed is a system and method that overcomes these significant problems found in the conventional systems as described above.

SUMMARY OF THE INVENTION

Accordingly, a slide rack inventory and reinsertion system is described herein for use with a digital slide scanning apparatus. In an embodiment, the system is configured to determine a status of each slot in a slide rack as properly occupied, improperly occupied, or empty. The system includes a sensor mount with a first arm and an opposing second arm that are positioned to define an opening through which a slide rack can be conveyed. A sensor having a transmitter and a receiver is attached to the sensor mount, with one of the transmitter or receive on a first arm and the other of the transmitter or receiver on the second arm. The transmitter and receiver are positioned such that they have an operational line-of-sight between them and such that the line-of-sight passes through each slot of a slide rack as the slide rack is conveyed through the opening between the two arms. The line-of-sight is also substantially parallel to a plane of a glass slide on a scanning stage of the digital slide scanning apparatus. The line-of-sight is also positioned such that as the slide rack is conveyed through the opening between the two arms, a rear portion of each glass slide passes through the line-of-sight of the sensor pair. The rear portion of a glass slide is the portion that is further away from the opening through which a glass slide is inserted to or removed from the slide rack.

In operation as the slide rack is conveyed through the opening, the sensor pair sends a signal to a processor that analyzes the signal to determine if a glass slide is present in each slot of the slide rack. The status for each slot in the slide rack may be empty, occupied, stacked or askew.

Additionally, when the scanning of a slide is completed, the slide is inserted back into the slide rack. Because the line-of-sight of the sensor pair is substantially parallel to the plane of the glass slide being conveyed from the scanning stage to the slide rack, the sensor pair sends a signal to the processor that analyzes the signal to determine if the glass slide has been properly reinserted into the slide rack.

In an embodiment, a digital slide scanning apparatus comprises a motor configured to position a slide rack within the digital slide scanning apparatus, the slide rack configured to hold a plurality of glass slides in a plurality of slots, wherein each slot has an opening at a first end of the slot and a barrier at a second end of the slot. The digital slide scanning apparatus also includes a sensor pair comprising a transmitter element and a receiver element positioned for line-of-sight communication, the transmitter element positioned on a first side of a sensor mount and the receiver element positioned on a second side of the sensor mount. The digital slide scanning apparatus also includes a processor configured to control the motor to move the slide rack to pass a rear portion of each of the plurality of slots of the slide rack through the line-of-sight communication of the sensor pair, the processor further configured to receive a signal from the sensor pair and analyze the signal to determine a status of each slot of the slide rack.

In an embodiment, is a method in a digital slide scanning apparatus that comprises a motor configured to position a slide rack within the digital slide scanning apparatus, the slide rack configured to hold a plurality of glass slides in a plurality of slots, a sensor pair comprising a transmitter element and a receiver element relatively positioned for line-of-sight communication, and at least one processor. The method comprises, by the at least one processor, driving the motor to move the slide rack between the transmitter element and the receiver element, passing a rear portion of each of the plurality of slots of the slide rack through the line-of-sight communication of the sensor pair during said movement of the slide rack, receiving a signal from the sensor pair during movement of the slide rack, correlating at least a portion of the signal from the sensor pair to each of the plurality of slots of the slide rack, analyzing the portion of the signal from the sensor pair corresponding to each of the plurality of slots, and determining a status of each of the plurality of slots based on the analysis.

In an embodiment, a digital slide scanning apparatus comprises a motor configured to position a slide rack having a plurality of slots and holding a plurality of glass slides, a sensor pair comprising a transmitter element and a receiver element positioned for line-of-sight communication passing through a rear portion of a first slot of the slide rack, and a processor configured to receive a signal from the sensor pair during reinsertion of a first glass slide into the first slot of the slide rack and analyze the signal to determine a reinsertion status of the first slide into the first slot.

In an embodiment is a method in a digital slide scanning apparatus that comprises a motor configured to position a slide rack within the digital slide scanning apparatus, the slide rack configured to hold a plurality of glass slides in a plurality of slots, a sensor pair comprising a transmitter element and a receiver element positioned for line-of-sight communication passing through a rear portion of a first slot of the slide rack, and at least one processor. The method comprises, by the at least one processor, receiving a signal from the sensor pair during reinsertion of a first glass slide into the first slot of the slide rack, and analyzing the signal to determine a reinsertion status of the first slide into the first slot.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION OF THE PREFERRED EMBODIMENT

Embodiments disclosed herein provide for a slide rack inventory and slide loading validation system for use with a digital slide scanning apparatus that is configured to determine a status of each slot in a slide rack as properly occupied, improperly occupied, or empty. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
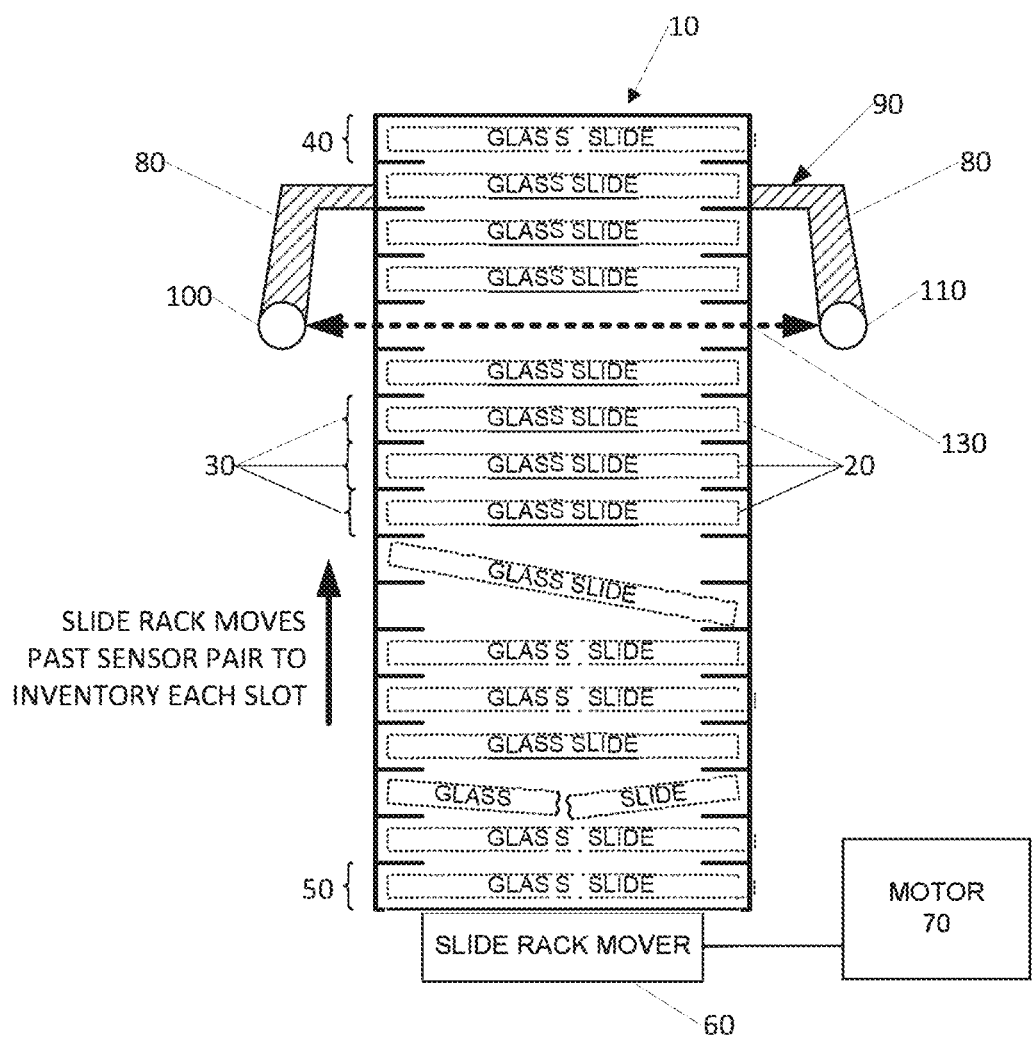
FIG. 1 is a front view diagram illustrating an example slide rack with a plurality of slides in the slide rack slots according to an embodiment.

FIG. 1 is a front view diagram illustrating an example slide rack 10 with a plurality of slides 20 in the slide rack 10 slots 30 according to an embodiment. In the illustrated embodiment, the slide rack 10 includes a plurality of slots 30 for glass slides 20. The slide rack 10 has a specific up and down orientation with a top slot 40 and a bottom slot 50. The slide rack 10 is conveyed by a slide rack mover 60 that is powered by a motor 70. The slide rack mover 60 is configured to move the slide rack 10 along a linear axis and pass the slide rack 10 between the arms 80 of a sensor mount 90. In one embodiment, the sensor mount 90 is configured to adjust up and down to fine tune the alignment of the transmit element 100 and receive element 110 of the sensor 120 with a properly positioned glass slide 20 in a slide rack 10.

Each arm 80 of the sensor mount 90 includes one half of a pair of transmit 100 and receive 110 elements of a sensor 120. The transmit 100 element and the receive 110 element are relatively positioned in a line-of-sight 130 orientation and the plane of the line-of-sight 130 is substantially parallel to a plane of a glass slide 20 on the scanning stage and/or substantially parallel to a plane of a glass slide 20 being inserted into the slide rack 10. In operation, the slide rack mover 60 moves the slide rack 10 in a fashion that causes each of the slots 30 of the slide rack 10 to pass through the line-of-sight 130 of the sensor 120 pair. In alternative embodiments, the transmit 100 and receive 110 elements may be oriented such that the transmit 100 element is closer to the glass slide 20 than the receive 110 element or such that the transmit 100 element is further from the glass slide 20 than the receive 110 element or such that the transmit 100 element is the same distance from the glass slide 20 as the receive 110 element. A processor (not shown) receives a signal from the sensor 120 pair (comprising the transmit 100 element and the receive 110 element) and analyzes the signal to determine a status for each slot 30 of the slide rack 10. In one embodiment, the status can be occupied or empty and more specifically, occupied can be occupied-normal, occupied-stacked, occupied-askew or occupied-abnormal. Occupied normal is when a single slide 20 is appropriately positioned in the slot 30. Occupied-stacked is when two slides 20 are stacked on top of each other in a single slot 30. Occupied-askew is when a single slide 20 is positioned at an angle and occupies two adjacent slots 30. Occupied-abnormal is when a single slide 20 is broken or otherwise improperly positioned in a single slot 30. The processor is also configured to determine a status for the slide rack 10 as a whole.

In an alternative embodiment, the transmit 100 and receive 110 elements are positioned for optical communication in accordance with a refraction of the transmit signal through the glass slide 20. For example, the transmit 100 and the receive 110 elements may be offset from a direct line of sight orientation. Additionally, the transmit 100 and receive 110 elements may also be oriented such that the transmit 100 element is closer to the glass slide 20 than the receive 110 element or such that the transmit 100 element is further from the glass slide 20 than the receive 110 element or such that the transmit 100 element is the same distance from the glass slide 20 as the receive 110 element.

In operation, the motor 70 (e.g., under control of the processor) causes the slide rack mover 60 to lift the slide rack 10 and pass each slot 30 through the line-of-sight 130 of the sensor 120 pair. The processor receives a signal from the sensor 120 pair and correlates the received signal to each slot 30. The processor analyzes the signal for each slot 30 to determine the status of each slot 30. If any slot 30 is determined to be improper (e.g., occupied-stacked or occupied-askew) then the entire rack 10 may be rejected for scanning. Alternatively, the improperly occupied slots 30 may just be skipped when processing the glass slides 20 and/or the rack 10. Empty slots 30 may also be skipped to decrease overall scanning operation time.

Figure 2:
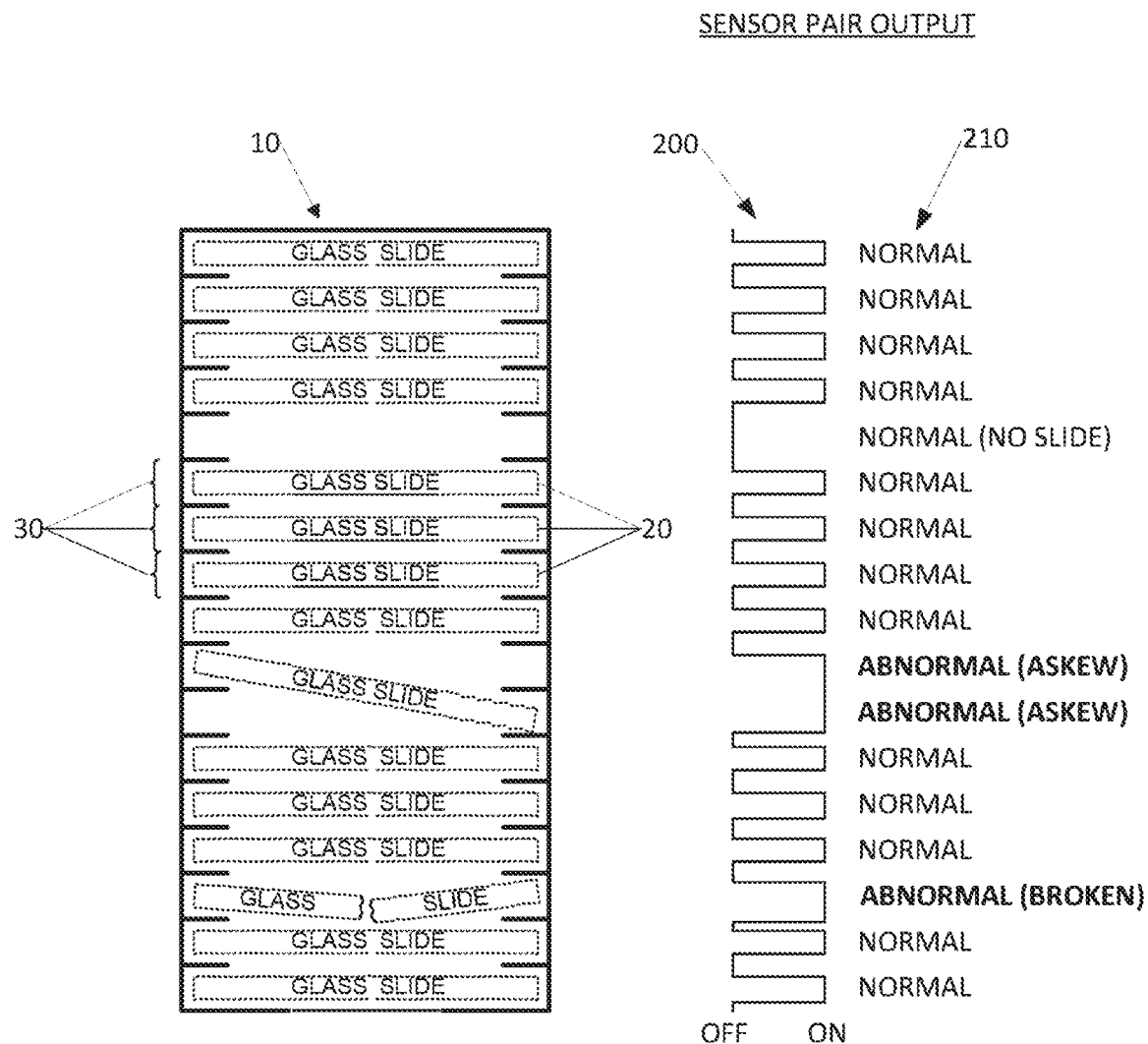
FIG. 2 is a block diagram illustrating an example sensor pair output signal corresponding to a slide rack inventory according to an embodiment.

FIG. 2 is a block diagram illustrating an example sensor pair output signal 200 corresponding to a slide rack 10 inventory according to an embodiment. In the illustrated embodiment, when an inventory of the slide rack 10 is performed before scanning the glass slide 20 in a first slot, the sensor pair sends a continuous signal 200 to the processor. As the slide rack 10 is passed through the line-of-sight (or refraction oriented sight line) of the sensor pair, the signal 200 from the sensor pair is either OFF or ON. In one embodiment, the sensor pair is configured to generate an OFF signal in the absence of any structure in the line-of-sight and also configured to generate an ON signal in the presence of any structure in the line-of-sight. Advantageously, at a rear portion of the slide rack 10 where the sensor pair is located, there is no structure of the slide rack 10 between the top of the slide rack and the bottom of the slide rack. As shown in FIG. 2, the sensor pair generates the illustrated signal 200 when a slide inventory is conducted on the illustrated slide rack 10. The processor is configured to receive the signal 200 from the sensor pair and correlate the signal 200 to each slot 30 of the slide rack 10 and analyze the signal 200 for each slot 30 to determine a status 210 for each slot 30 in the slide rack 10. In the illustrated embodiment, the status 210 for nearly all slots 30 is normal, including the empty slot 30, which has a status of NORMAL—NO SLIDE. However, the status 210 of each of two adjacent slots 30 is ABNORMAL—ASKEW because a single slide 20 is angled between the two adjacent slots 30. Similarly, the status 210 of a single slide is ABNORMAL—BROKEN because a single slide 20 is broken in the slot 30. Not shown is a status of ABNORMAL—STACKED, which would be where two glass slides 20 are stacked on top of each other in a single slot 30.

In one embodiment, because the status 210 of at least a single slot 30 is ABNORMAL, the status of the entire slide rack 10 is ABNORMAL. Accordingly, the processor may generate an error status and stop processing of the slide rack 10. Alternatively, the processor may generate an error status and continue processing of the normal slots 30 in the slide rack 10. In one embodiment, if the status 210 of all slots 30 is NORMAL (including NORMAL—NO SLIDE) then the status of the entire slide rack 10 is NORMAL and the processor is configured to process each glass slide 20 in the slide rack 10, while skipping the slot 30 without a glass slide 20 to save time.

Figure 3A:
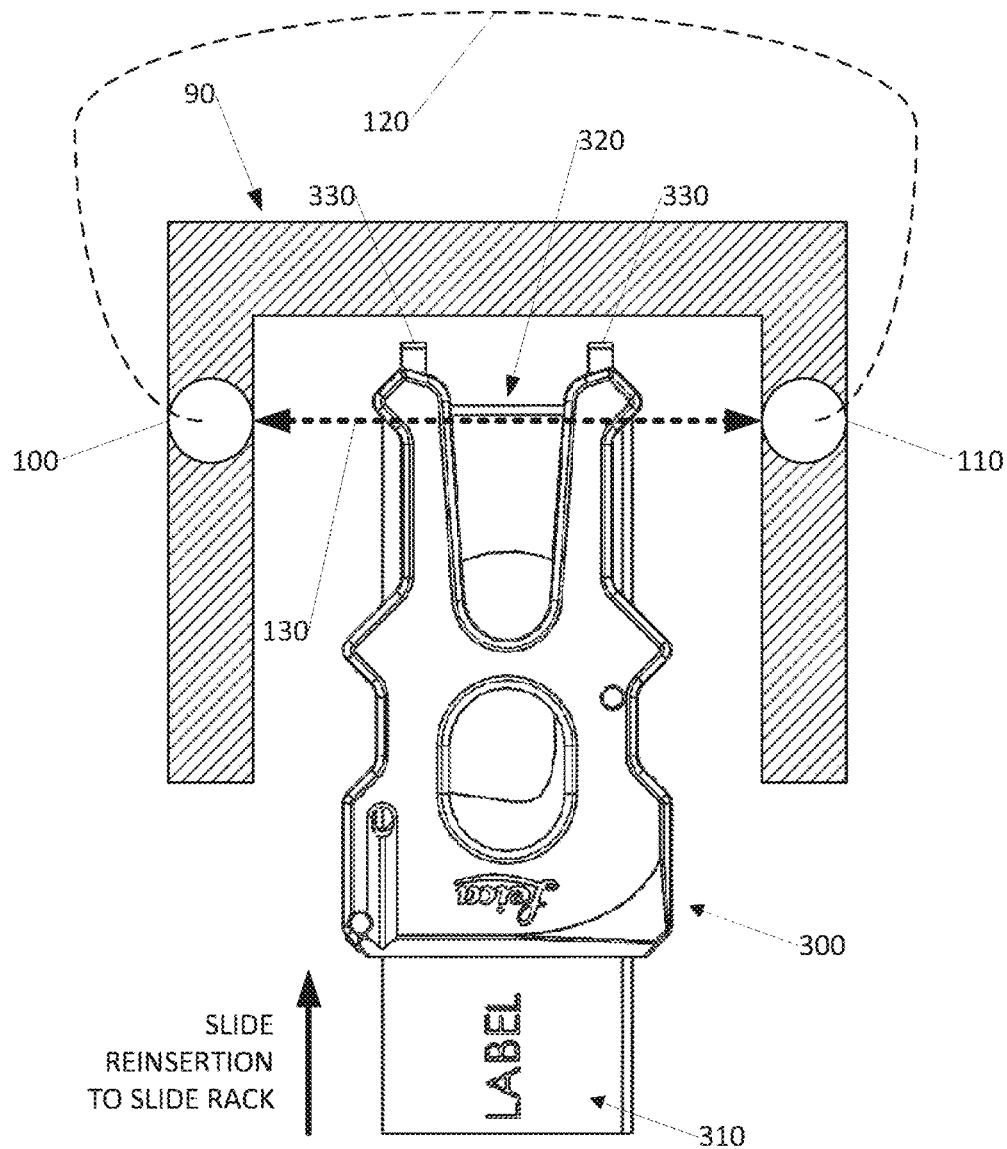
FIG. 3A is a top view diagram illustrating an example slide reinsertion check for a first manufacturer slide rack according to an embodiment.

FIG. 3A is a top view diagram illustrating an example slide reinsertion check for a slide rack 300 made by a first manufacturer according to an embodiment. In the illustrated embodiment, the sensor mount 90 supports a sensor 120 pair comprising a transmit element 100 and a receive element 110. An output of the sensor 120 is coupled to the processor (not shown). The sensor 120 pair is positioned such that the line-of-sight 130 is positioned toward the back end of the slide rack 300 made by the first manufacturer. Advantageously, the positioning of the sensor 120 pair places the line-of-sight 130 toward the back end of any slide rack made by any manufacturer. This positioning of the sensor 120 pair on the sensor mount 90 operates for both the slide inventory process and the slide reinsertion check process.

In the slide reinsertion check process, when the processing (e.g., scanning) of a glass slide 310 is completed, the glass slide 310 is inserted back into the slide rack 300. This is done by pushing the glass slide 310 through an opening in a front portion of the slot and into the slide rack 300. Advantageously, the slide rack 300 comprises a barrier 330 at a rear portion of the slide rack 300 that prevents the glass slide 310 from passing completely through the slide rack 300 when the slide is pushed into a slot of the slide rack 300.

In some instances, reinsertion of the glass slide 310 may be unsuccessful. Advantageously, the positioning of the line-of-sight 130 of the sensor 120 pair near the back of a slide rack 300 allows the processor to analyze a signal from the sensor 120 pair to confirm that a slide 310 has been reinserted properly, e.g., completely pushed into the rack slot. For example, if a slide 310 is properly and fully reinserted into the slide rack 300 such that the back edge 320 of the slide 310 engages a barrier 330 that prevents the glass slide 310 from passing, the line-of-sight 130 of the sensor 120 pair is interrupted by at least a portion of the back edge 320 of the slide 310. However, if a slide 310 is not properly reinserted, the line-of-sight 130 of the sensor 120 pair is not interrupted. The processor is configured to analyze a signal from the sensor 120 pair to confirm whether or not a slide 310 has been properly reinserted into the slide rack 300. If a slide 310 is not properly reinserted, the processor may cause the reinsertion process to abort and retry or alternatively operation of the digital slide scanning apparatus may be suspended and an alert generated to request operator intervention.

Figure 3B:
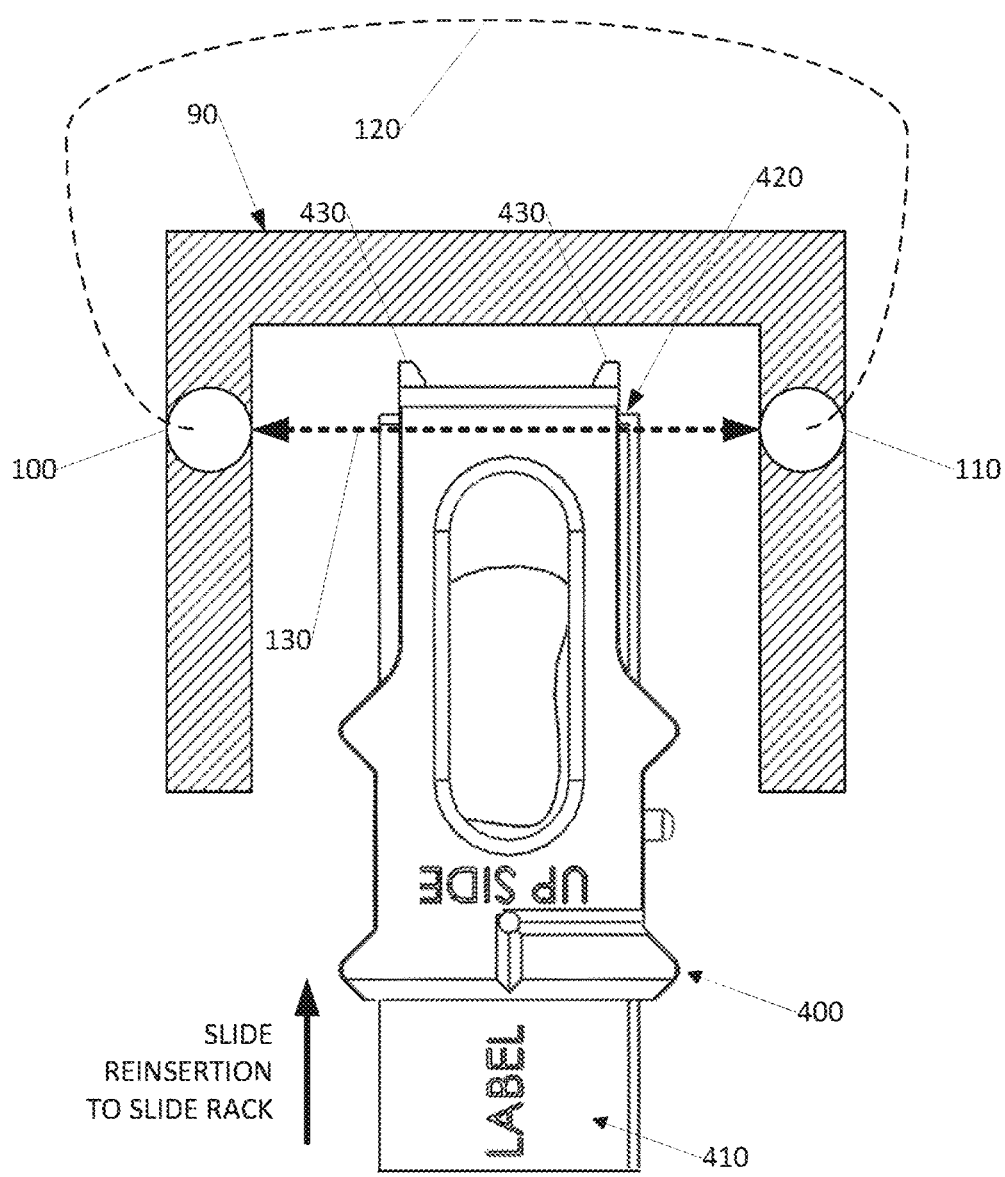
FIG. 3B is a top view diagram illustrating an example slide reinsertion check for a second manufacturer slide rack according to an embodiment.

FIG. 3B is a top view diagram illustrating an example slide reinsertion check for a slide rack 400 made by a second manufacturer according to an embodiment. In the illustrated embodiment, the sensor mount 90 supports a sensor 120 pair comprising a transmit element 100 and a receive element 110. An output of the sensor 120 is coupled to the processor (not shown). The sensor 120 pair is positioned such that the line-of-sight 130 is positioned toward the back end of the slide rack 400 made by the second manufacturer. Advantageously, the positioning of the sensor 120 pair places the line-of-sight 130 toward the back end of any slide rack made by any manufacturer. This positioning of the sensor 120 pair on the sensor mount 90 operates for both the slide inventory process and the slide reinsertion check process.

As discussed above, in the slide reinsertion check process, when the processing (e.g., scanning) of a glass slide 410 is completed, the glass slide 410 is inserted back into the slide rack 400. This is done by pushing the glass slide 410 through an opening in a front portion of the slot and into the slide rack 400. Advantageously, the slide rack 400 similarly comprises a barrier 430 at a rear portion of the slide rack 400 that prevents the glass slide 410 from passing completely through the slide rack 400 when the slide is pushed into a slot of the slide rack 400.

In the slide reinsertion check process, when the processing (e.g., scanning) of a glass slide 410 is completed, the glass slide 410 is inserted back into the slide rack 400. In some instances, reinsertion of the glass slide 410 may be unsuccessful. Advantageously, the positioning of the line-of-sight 130 of the sensor 120 pair near the back of a slide rack 400 allows the processor to analyze a signal from the sensor 120 pair to confirm that a slide 410 has been reinserted properly, e.g., completely pushed into the rack slot. For example, if a slide 410 is properly reinserted, the line-of-sight 130 of the sensor 120 pair is interrupted. However, if a slide 410 is not properly reinserted, the line-of-sight 130 of the sensor 120 pair is not interrupted.

The processor is configured to analyze a signal from the sensor 120 pair to confirm whether or not a slide 410 has been properly reinserted into the slide rack 400. If a slide 410 is not properly reinserted, the processor may cause the reinsertion process to abort and retry or alternatively operation of the digital slide scanning apparatus may be suspended and an alert generated to request operator intervention.

EXAMPLE EMBODIMENTS

In one embodiment, a digital slide scanning apparatus includes a motor configured to position a slide rack having a plurality of slots, the slide rack having a top slot and a bottom slot and holding a plurality of glass slides. The motor is also configured to position the slide rack for processing of a first slide from a first slot, for example a slide occupying the bottom slot. The digital slide scanning apparatus also includes a sensor pair comprising a transmitter element and a receiver element positioned in a line-of-sight orientation, a first one of the transmitter element or the receiver element is positioned on a first side of a sensor mount and a second one of the transmitter element or the receiver element positioned on a second side of a sensor mount. When the slide rack is positioned for processing the first slide, each of the plurality of slots of the slide rack is passed through the line-of-sight of the sensor pair. The digital slide scanning apparatus also includes a processor configured to control the motor to position the slide rack for processing of the first slide. The processor is also configured to receive a signal from the sensor pair and correlate the signal to each of the plurality of slots. The processor is also configured to analyze the signal corresponding to each of the plurality of slots to determine a status of each of the plurality of slots.

In one embodiment, the status of each of the plurality of slots is one of: occupied or empty. In one embodiment, the status of each occupied slot is one of: normal or askew. In one embodiment, the status of each of the plurality of slots is determined prior to scanning the first slide.

In one embodiment, subsequent to determining the status for each of the plurality of slots, the first slide is unloaded from the first slot for processing and later reinserted to the first slot after processing. In this embodiment, the processor is further configured to receive a signal from the sensor pair corresponding to the first slot during reinsertion and analyze the signal corresponding to the first slot during reinsertion to determine a reinsertion status of the first slide into the first slot. In one aspect of this embodiment, the reinsertion status is one of: proper or improper.

In one embodiment, the sensor pair is positioned such that a plane of the line-of-sight of the sensor pair is substantially the same as a plane occupied by the glass during scanning.

In one embodiment, a method includes using a motor to position a slide rack for processing of glass slides in the slide rack. In this embodiment, the slide rack comprises a plurality of slots including a top slot and a bottom slot and the slide rack holds a plurality of glass slides. Also, the position for processing of glass slides in the slide rack is a position for loading a first slide occupying a first slot onto a scanning stage. In this method, using the motor to position the slide rack for processing of glass slides in the slide rack comprises moving the slide rack between first and second sides of a sensor mount supporting a sensor pair comprising a transmitter element and a receiver element positioned in a line-of-sight orientation. A first one of the transmitter element or the receiver element is positioned on a first side of the sensor mount and a second one of the transmitter element or the receiver element is positioned on a second side of a sensor mount such that moving the slide rack comprises passing each of the plurality of slots of the slide rack through the line-of-sight of the sensor pair. The method also includes using a processor to control the motor to position the slide rack for processing of the first slide, using the processor to receive a signal from the sensor pair and correlate the signal to each of the plurality of slots, using the processor to analyze the signal corresponding to each of the plurality of slots, and using the processor to determine a status of each of the plurality of slots.

In one embodiment, the status of each of the plurality of slots is one of: occupied or empty. In one embodiment, the status of each occupied slot is one of: normal or askew. In one embodiment, the method also includes determining the status of each of the plurality of slots prior to scanning the first slide. In one embodiment, the method also includes subsequent to determining the status for each of the plurality of slots, unloading the first slide from the first slot for processing, reinserting the first slide to the first slot after processing, using the processor to receive a signal from the sensor pair corresponding to the first slot during reinsertion, and using the processor to analyze the signal corresponding to the first slot during reinsertion to determine a reinsertion status of the first slide into the first slot.

In one embodiment, the reinsertion status is one of: proper or improper. In one embodiment, using the motor to position the slide rack for processing of glass slides in the slide rack comprises positioning the sensor pair such that a plane of the line-of-sight of the sensor pair is substantially the same as a plane occupied by the glass during scanning.

Figure 4A:
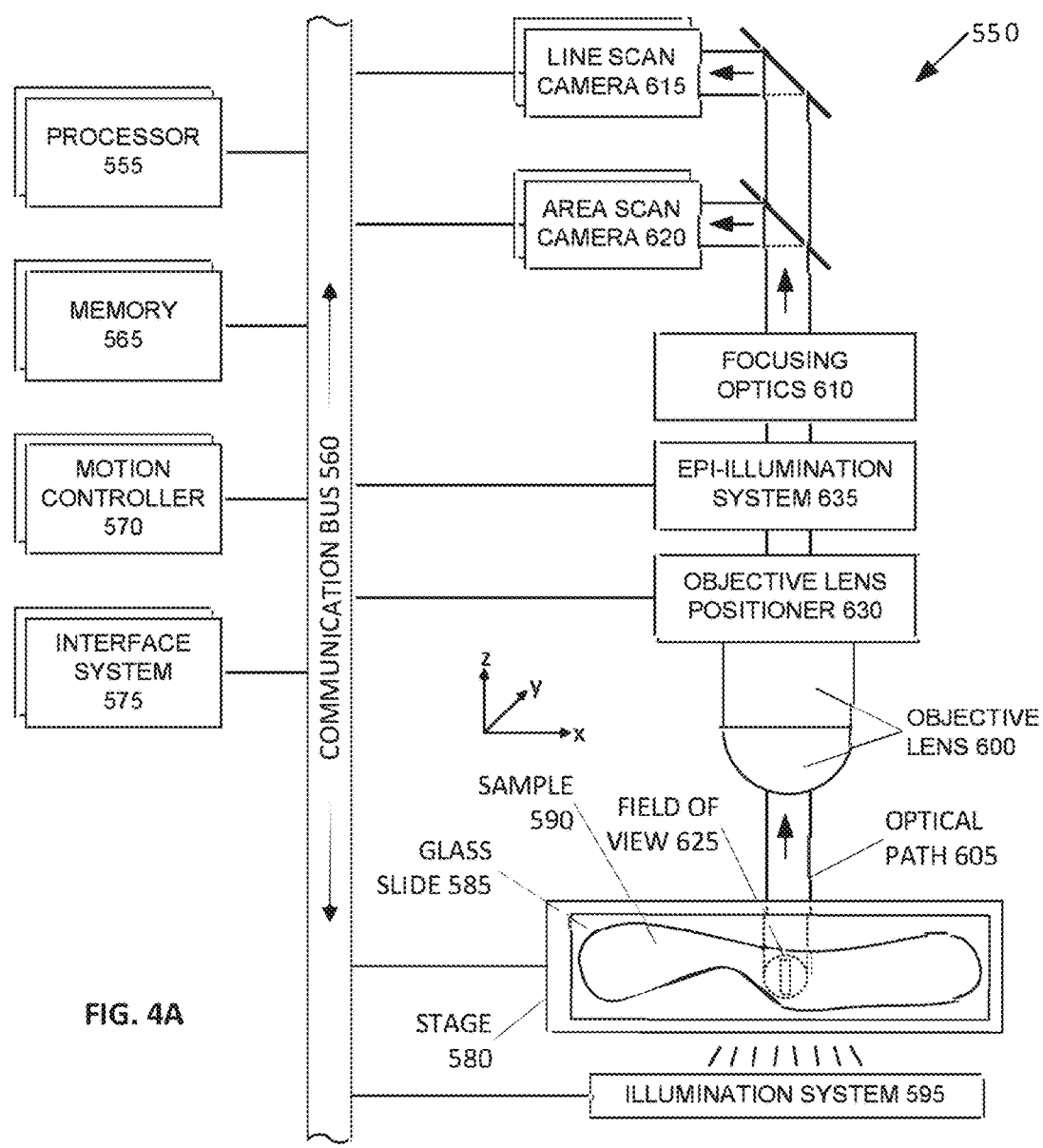
FIG. 4A is a block diagram illustrating an example processor enabled device 550 that may be used in connection with various embodiments described herein.

FIG. 4A is a block diagram illustrating an example processor enabled device 550 that may be used in connection with various embodiments described herein. Alternative forms of the device 550 may also be used as will be understood by the skilled artisan. In the illustrated embodiment, the device 550 is presented as a digital imaging device (also referred to herein as a scanner system, a scanning system, a scanning apparatus, a digital scanning apparatus, a digital slide scanning apparatus, etc.) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more additional cameras 620 (e.g., a line scan camera or an area scan camera), each of which define a separate field of view 625 on the sample 590 and/or glass slide 585. The various elements of the scanner system 550 are communicatively coupled via one or more communication busses 560. Although there may be one or more of each of the various elements of the scanner system 550, for the sake of simplicity, these elements will be described herein in the singular except when needed to be described in the plural to convey the appropriate information.

The one or more processors 555 may include, for example, a central processing unit ("CPU") and a separate graphics processing unit ("GPU") capable of processing instructions in parallel or the one or more processors 555 may include a multicore processor capable of processing instructions in parallel. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal processing algorithms (e.g., digital signal processor), a slave processor subordinate to the main processor (e.g., back-end processor), an additional processor for controlling the line scan camera 615, the stage 580, the objective lens 225, and/or a display (not shown). Such additional processors may be separate discrete processors or may be integrated with the processor 555.

In one embodiment, the processor 555 is configured to control movement of the slide rack and to receive and analyze the signal from the sensor 90 pair to determine the presence, absence or misalignment of glass slides 20 in a slide rack 10. In one embodiment, the processor 555 is configured to control reinsertion of a glass slide 20 into the slide rack 10 and to receive and analyze the signal 200 from the sensor 90 pair to determine proper reinsertion of the glass slide 20 into the slide rack 10.

The memory 565 provides storage of data and instructions for programs that can be executed by the processor 555. The memory 565 may include one or more volatile and/or nonvolatile computer-readable storage mediums that store the data and instructions, including, for example, a random access memory, a read only memory, a hard disk drive, a removable storage drive, and/or the like. The processor 555 is configured to execute instructions that are stored in the memory 565 and communicate via communication bus 560 with the various elements of the scanner system 550 to carry out the overall function of the scanner system 550.

The one or more communication busses 560 may include a communication bus 560 that is configured to convey analog electrical signals and may include a communication bus 560 that is configured to convey digital data. Accordingly, communications from the processor 555, the motion controller 570, and/or the interface system 575 via the one or more communication busses 560 may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate X, Y, and/or Z movement of the stage 580 (e.g., within an X-Y plane) and/or the objective lens 600 (e.g., along a Z axis orthogonal to the X-Y plane, via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium) or external devices such as an image server system, an operator station, a user station, and an administrative server system that are connected to the scanner system 550 via a network (not shown).

The illumination system 595 is configured to illuminate a portion of the sample 590. The illumination system may include, for example, a light source and illumination optics. The light source may comprise a variable intensity halogen light source with a concave reflective mirror to maximize light output and a KG-1 filter to suppress heat. The light source could also comprise any type of arc-lamp, laser, or other source of light. In one embodiment, the illumination system 595 illuminates the sample 590 in transmission mode such that the line scan camera 615 and/or camera 620 sense optical energy that is transmitted through the sample 590. Alternatively, or in combination, the illumination system 595 may also be configured to illuminate the sample 590 in reflection mode such that the line scan camera 615 and/or camera 620 sense optical energy that is reflected from the sample 590. The illumination system 595 may be configured to be suitable for interrogation of the microscopic sample 590 in any known mode of optical microscopy.

In one embodiment, the scanner system 550 optionally includes an epi-illumination system 635 to optimize the scanner system 550 for fluorescence scanning. Fluorescence scanning is the scanning of samples 590 that include fluorescence molecules, which are photon sensitive molecules that can absorb light at a specific wavelength (excitation). These photon sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615 that includes multiple linear sensor arrays (e.g., a time delay integration ("TDI") line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10 bit 64 linear array TDI line scan camera. It should be noted that a variety of bit depths for the line scan camera 615 can be employed for use with a fluorescence scanner embodiment of the scanning system 550.

The movable stage 580 is configured for precise X-Y movement under control of the processor 555 or the motion controller 570. The movable stage may also be configured for Z movement under control of the processor 555 or the motion controller 570. The movable stage is configured to position the sample in a desired location during image data capture by the line scan camera 615 and/or the area scan camera. The movable stage is also configured to accelerate the sample 590 in a scanning direction to a substantially constant velocity and then maintain the substantially constant velocity during image data capture by the line scan camera 615. In one embodiment, the scanner system 550 may employ a high precision and tightly coordinated X-Y grid to aid in the location of the sample 590 on the movable stage 580. In one embodiment, the movable stage 580 is a linear motor based X-Y stage with high precision encoders employed on both the X and the Y axis. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA or RNA or protein that is deposited on any type of slide or other substrate, including any and all samples commonly known as a microarrays. The sample 590 may be a microtiter plate, (e.g., a 96-well plate). Other examples of the sample 590 include integrated circuit boards, electrophoresis records, petri dishes, film, semiconductor materials, forensic materials, or machined parts.

Objective lens 600 is mounted on the objective positioner 630 which, in one embodiment, employs a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in X, Y, and/or Z axes are coordinated and controlled in a closed loop manner using motion controller 570 under the control of the processor 555 that employs memory 565 for storing information and instructions, including the computer-executable programmed steps for overall scanning system 550 operation.

In one embodiment, the objective lens 600 is a plan apochromatic ("APO") infinity corrected objective with a numerical aperture corresponding to the highest spatial resolution desirable, where the objective lens 600 is suitable for transmission mode illumination microscopy, reflection mode illumination microscopy, and/or epi-illumination mode fluorescence microscopy (e.g., an Olympus 40×, 0.75 NA or 20×, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, and/or the like. The objective lens 600 combined with the focusing optics 610 provides the total magnification for the scanning system 550. In one embodiment, the focusing optics 610 may contain a tube lens and an optional 2× magnification changer. Advantageously, the 2× magnification changer allows a native 20× objective lens 600 to scan the sample 590 at 40× magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, 3 linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays, for example, TDI line scan cameras are available with 24, 32, 48, 64, 96, or even more linear arrays. The scanner system 550 also supports linear arrays that are manufactured in a variety of formats including some with 512 pixels, some with 1024 pixels, and others having as many as 4096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615 so that the stage 580 can be in motion with respect to the line scan camera 615 during the digital image capture of the sample 590.

The image data generated by the line scan camera 615 is stored a portion of the memory 565 and processed by the processor 555 to generate a contiguous digital image of at least a portion of the sample 590. The contiguous digital image can be further processed by the processor 555 and the revised contiguous digital image can also be stored in the memory 565.

In an embodiment with two or more line scan cameras 615, at least one of the line scan cameras 615 can be configured to function as a focusing sensor that operates in combination with at least one of the other line scan cameras 615 that is configured to function as an imaging sensor. The focusing sensor can be logically positioned on the same optical axis as the imaging sensor or the focusing sensor may be logically positioned before or after the imaging sensor with respect to the scanning direction of the scanner system 550. In such an embodiment with at least one line scan camera 615 functioning as a focusing sensor, the image data generated by the focusing sensor is stored in a portion of the memory 565 and processed by the one or more processors 555 to generate focus information to allow the scanner system 550 to adjust the relative distance between the sample 590 and the objective lens 600 to maintain focus on the sample during scanning. Additionally, in one embodiment the at least one line scan camera 615 functioning as a focusing sensor may be oriented such that each of a plurality of individual pixels of the focusing sensor is positioned at a different logical height along the optical path 605.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data, e.g., an adjacent stripe. Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image strip. A plurality of adjacent image strips are similarly combined together to form a contiguous digital image of a portion or the entire sample 590. The scanning of the sample 590 may include acquiring vertical image strips or horizontal image strips. The scanning of the sample 590 may be either top-to-bottom, bottom-to-top, or both (bi-directional) and may start at any point on the sample. Alternatively, the scanning of the sample 590 may be either left-to-right, right-to-left, or both (bi-directional) and may start at any point on the sample. Additionally, it is not necessary that image strips be acquired in an adjacent or contiguous manner. Furthermore, the resulting image of the sample 590 may be an image of the entire sample 590 or only a portion of the sample 590.

In one embodiment, computer-executable instructions (e.g., programmed modules and software) are stored in the memory 565 and, when executed, enable the scanning system 550 to perform the various functions described herein. In this description, the term "computer-readable storage medium" is used to refer to any media used to store and provide computer executable instructions to the scanning system 550 for execution by the processor 555. Examples of these media include memory 565 and any removable or external storage medium (not shown) communicatively coupled with the scanning system 550 either directly or indirectly, for example via a network (not shown).

Figure 4B:
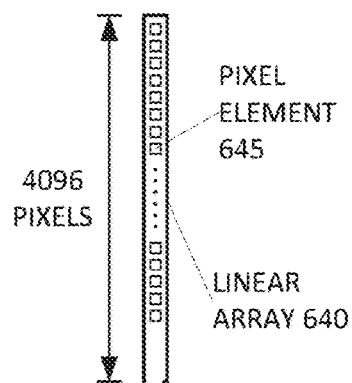
FIG. 4B is a block diagram illustrating an example line scan camera having a single linear array.

FIG. 4B illustrates a line scan camera having a single linear array 640, which may be implemented as a charge coupled device ("CCD") array. The single linear array 640 comprises a plurality of individual pixels 645. In the illustrated embodiment, the single linear array 640 has 4096 pixels. In alternative embodiments, linear array 640 may have more or fewer pixels. For example, common formats of linear arrays include 512, 1024, and 4096 pixels. The pixels 645 are arranged in a linear fashion to define a field of view 625 for the linear array 640. The size of the field of view 625 varies in accordance with the magnification of the scanner system 550.

Figure 4C:
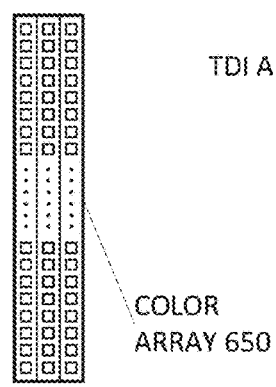
FIG. 4C is a block diagram illustrating an example line scan camera having three linear arrays.

FIG. 4C illustrates a line scan camera having three linear arrays, each of which may be implemented as a CCD array. The three linear arrays combine to form a color array 650. In one embodiment, each individual linear array in the color array 650 detects a different color intensity, for example red, green, or blue. The color image data from each individual linear array in the color array 650 is combined to form a single field of view 625 of color image data.

Figure 4D:
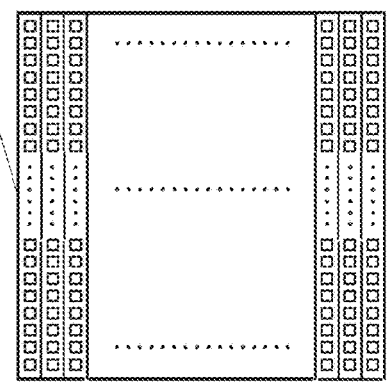
FIG. 4D is a block diagram illustrating an example line scan camera having a plurality of linear arrays.

FIG. 4D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays, for example common formats of TDI line scan cameras include 24, 32, 48, 64, 96, 120 and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A digital slide scanning apparatus, comprising:
   a slide rack having multiple slots, each slot configured to hold a glass slide, each slot including an insertion opening at a first end of the slot in a front portion of the slide rack and a barrier at a second end of the slot in a rear portion of the slide rack;
   a sensor pair comprising a transmitter element and a receiver element;
   a motor configured to adjust positioning of the slide rack with respect to the sensor pair through a sequence of positions corresponding to the multiple slots;
   the sensor pair being positioned between the first end and the second end such that the sensor pair is configured for line-of-sight communication through the multiple slots as the motor causes movement through the sequence; and
   a processor configured to, as the motor causes movement through the sequence, receive and analyze signals from the sensor pair to determine slot status for each slot.

2. The apparatus of claim 1, wherein determining slot status for each slot comprises determining if a glass slide is present or absent and if present, whether the slide is normal or abnormally positioned.

3. The apparatus of claim 2, wherein determining slot status for each slot further comprises determining if a glass slide is askew or broken.

4. The apparatus of claim 1, wherein the sensor pair is positioned in a plane that parallels a plane of one of the multiple slots such that line-of-sight communication between the transmitter element and receiver element indicates the slot status of that one particular slot at each of the sequence of positions.

5. The apparatus of claim 1, wherein the motor moves the position of the slide rack with respect to the sensor pair such that each slot sequentially passes through the line of site line-of-sight between the transmitter element and the receiver element.

6. The apparatus of claim 2, wherein if the processor determines that any slot in the slide rack has an abnormally-positioned slide, the processor prevents the slide rack from continuing a scanning process for that slide rack.

7. The apparatus of claim 2, wherein if the processor determines that no slot in the slide rack has an abnormally-positioned slide, the processor allows the slide rack to proceed with a scanning process.

8. The apparatus of claim 2, each barrier being configured to prevent slides from passing completely through a respective slot, and wherein the sensor pair is positioned such that the line of sight traverses each slot toward the back barrier, thereby allowing signals to support both a slide inventory process and a slide insertion check process.

9. An automatic slide scanner system comprising:
scanner components comprising a processor, a memory, a motion controller, a movable stage, an illuminator, a lens, a camera, and a communication bus; and
slide handling components comprising:
at least one slide rack having multiple slots, each slot configured to hold a glass slide before and after the scanner components scan the slide such that the glass slide enters the slot through a front opening and is blocked from exiting by a rear barrier;
a sensor pair comprising a transmitter element and a receiver element and configured for use with slide racks of one or more different dimensions;
the sensor pair relatively oriented with the transmitter element and receiver element being positioned between the front opening and the rear barrier to transmit along line-of-sight that passes through the multiple slots in the slide rack;
a motor and positioning structure configured to position the sensor pair on either side of the rack with wide enough spacing to avoid interference with the slide racks of one or more different dimensions and to sequentially position the sensor pair on either side of a series of the slots;
the sensor pair configured for line-of-sight communication through the series of slots as the motor causes relative movement of the sensor pair and the slots; and
a processor configured to correlate signals from the sensor pair with each slot in each slide rack, based on the as the motor's movement through the sequence of positions, and to receive and analyze signals from the sensor pair to determine slot status for each slot.

10. The system of claim 9, wherein the sensor pair is further oriented to transmit along line-of-sight that passes through a rear portion of the multiple slots in the slide rack, thereby providing signals that indicate whether slides are fully inserted toward the rear barrier.

11. The system of claim 9, wherein the positioning structure comprises a sensor mount configured to adjust up and down.

12. The system of claim 9, further comprising a slide rack mover that is powered by the motor and configured to move the slide rack along a linear axis to pass the slide rack between the transmitter element and the receiving element such that each of the slots in the slide rack pass through the line of sight of the sensor pair.

13. The system of claim 9, wherein the sensor pair generates and sends a continuous signal to the processor.

14. The system of claim 13, wherein the continuous signal is binary, with a first state corresponding to an open line of sight between the pair and a second state corresponding to a blocked line of sight between the pair, and the processor is configured to interpret the continuous signal as the sensors pass by each of the slots in sequence to determine whether slides are present, absent, askew, broken, or stacked, and thereby whether a rack should continue in the scanning system.

15. The system of claim 9, further configured such that when the slide rack is positioned for processing a first slide, each of the multiple slots of the slide rack passes through the line of sight of the sensor pair.

16. The system of claim 9, further configured to process multiple moveable stages that each support one or more glass slides.

17. The system of claim 9, further configured such that:
slides are automatically taken from a slot in the slide rack and positioned on the moveable stage for processing by the camera, then reinserted in a slot in the slide rack; and
the sensor pair determines whether reinsertion was successful by determining if the line of sight for that slot is blocked near the back barrier.

* * * * *